US009818248B2

(12) United States Patent
Lin

(10) Patent No.: US 9,818,248 B2
(45) Date of Patent: Nov. 14, 2017

(54) COMPOUND AND SECURABLE KEY

(71) Applicant: SunASIC Technologies, Inc., New Taipei (TW)

(72) Inventor: Chi-Chou Lin, New Taipei (TW)

(73) Assignee: Sunasic Technologies Inc., New Taipei (TW)

( * ) Notice: Subject to any disclaimer, the term of this patent is extended or adjusted under 35 U.S.C. 154(b) by 180 days.

(21) Appl. No.: 14/071,737

(22) Filed: Nov. 5, 2013

(65) Prior Publication Data

US 2015/0123764 A1 May 7, 2015

(51) Int. Cl.
*G05B 19/00* (2006.01)
*G07C 9/00* (2006.01)

(52) U.S. Cl.
CPC ..... *G07C 9/00563* (2013.01); *G07C 9/00944* (2013.01); *G07C 2009/00095* (2013.01)

(58) Field of Classification Search
CPC ............ G07C 9/00031; G07C 9/00944; G07C 2009/00095
USPC ......................................................... 340/5.53
See application file for complete search history.

(56) References Cited

U.S. PATENT DOCUMENTS

2002/0076962 A1* 6/2002 Williams ............. H01R 13/627 439/188
2008/0261449 A1* 10/2008 Ni ........................ H01R 13/453 439/607.01
2009/0042433 A1* 2/2009 Bushby .............. H01R 13/4538 439/352
2009/0113963 A1* 5/2009 Pocrass .............. G07C 9/00087 70/277
2010/0287545 A1* 11/2010 Corbefin ............. G06F 9/44584 717/174
2010/0291783 A1* 11/2010 Chang ................ H01R 13/6397 439/304
2012/0254967 A1* 10/2012 Braun ..................... G06F 21/32 726/7
2013/0167226 A1* 6/2013 Lin ...................... H04M 1/0256 726/19
2013/0217252 A1* 8/2013 Carden .............. H01R 13/6275 439/304
2014/0315431 A1* 10/2014 Pocrass .................. H01R 27/02 439/607.01
2015/0058501 A1* 2/2015 Watanabe ........... G06F 11/3027 710/18
2015/0111430 A1* 4/2015 Kao ....................... H01R 24/60 439/607.55
2015/0116084 A1* 4/2015 Yeara ................. G07C 9/00309 340/5.65

* cited by examiner

*Primary Examiner* — Zhen Y Wu
(74) *Attorney, Agent, or Firm* — Che-Yang Chen; Law Offices of Scott Warmuth

(57) ABSTRACT

A compound and securable key is disclosed in the present invention. It includes a printed circuit board, a fingerprint sensor, a micro control unit, and a housing. The present invention provides a key structure with combination of a physical key patterns and biometrics for identification. The key is convenient to carry, difficult to duplicate. It is also has advantages such as low cost, easy use, and compact size of biometric module. The invention enhances security of keys.

10 Claims, 5 Drawing Sheets

COMPOUND AND SECURABLE KEY

FIELD OF THE INVENTION

The present invention relates to a key. More particularly, the present invention relates to a compound key, including a conventional key structure and an electronic identification. It is more securable than a common key used widely.

BACKGROUND OF THE INVENTION

It is hard to know when the key and lock were invented. They might be the most ancient security mechanism. The lock can be used in almost any places where precious articles need to be protected in any forms, for example, a lock for jewelry box or a door lock. Please refer to FIG. 1. A conventional set of key and lock is shown. A key 1 and a lock 2 are paired for use. The lock 2 has a locking mechanism 3. When the lock 2 works (locks), the locking mechanism 3 is firmly keeping a loop so that and rigid item enclosed can be restricted and its free movement is limited. This helps increase security of the enclosed item because it can not be moved at will. When the item needs to be used, the key 3 is plugged into a key hole 4. With a torque applied to the key 3 to unlock, the locking mechanism 3 is released.

Locks have numerous types of locks, such as warded locks, pin tumbler lock, wafer tumbler locks, etc. Sizes of the locks vary. No matter what the form of lock is or how large it is, for the key owner, the structure of key must satisfy below requirements: convenient carrying, difficult duplication, low cost (comparing with the corresponding lock) and easy use. Sometimes, people need more keys for a shared lock; for instance, members of a family use the same key for the front door lock. It incurs another issue, management of key distribution. How can people use the same key without a risk of misuse by any irrelevant person? Another solution, user identification, comes along.

There are lots of user identifications can be used. For example, companies usually use passwords for a second safeguard. Passwords are difficult for people to memorize, especially when they need to keep numbers of passwords for different usages. A commonly used form of key becomes E-cards which contain necessary information of the user and the password to replace people's memory. However, any people having ordinary skills in the art will know how to duplicate the E-cards. Security encounters challenges. It pushes inventers to look for more securable way to make safer keys. Biometrics is a very good choice.

Biometrics refers to the identification of humans by their characteristics or traits, for example, fingerprint, face recognition, DNA, Palm print, hand geometry, iris recognition, retina, tec. Biometrics is used in computer science as a form of identification and access control. Therefore, a combination of advantages of conventional keys and biometrics becomes a trend for security.

Among all the biometrics, fingerprint is most used feature for identification. It is not only people have been studying fingerprint for centuries, but there are already many electronic readers (modules) can be used for design. U.S. Pat. No. 6,671,808 has disclosed a USB compliant personal key which is a good example of application of fingerprint. The invention makes the USB key safer in use with the help of personal identification. However, it is pity that the '808 is a pure electronic key. There are no physical key patterns or mechanism which helps protection of data copy.

On the other hand, a trend of electronic devices is to make products as compact as possible. Therefore, when a compound key uses any electronic components, its dimension can not be large for carrying.

In summary, a compound key having below features is still desired: convenient carrying, difficult duplication, low cost, easy use, and compact size of biometric module for identification.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a compound and securable key includes a printed circuit board; a fingerprint sensor, installed in or on the printed circuit board, for fetching a fingerprint image, transforming the fingerprint image into a fingerprint data and transmitting the fingerprint data; a micro control unit, mounted on the printed circuit board and electrically linked to the fingerprint sensor, for receiving the fingerprint data, matching the fingerprint data with at least one of registered fingerprint datum by a fingerprint matching software and transmitting a matching data to an adaptor via a connector when the fingerprint data matches one registered fingerprint data; and a housing partially having patterns formed on at least a portion thereof and partially covering the printed circuit board, for exposing the fingerprint sensor, protecting the printed circuit board and the micro control unit and providing the patterns as an identification for a locking mechanism. When the matching data is transmitted to the adaptor and the identification is identified by the lock mechanism at the same time, a lock having accesses of the adaptor and the locking mechanism is unlocked.

Preferably, the printed circuit board has an extension portion which forms the connector for connecting with the adaptor.

Preferably, the connector is mounted on the printed circuit board for connecting with the adaptor.

Preferably, the connector is a Universal Serial Bus (USB) connector or an External Serial Advanced Technology Attachment (e-SATA) connector.

Preferably, the micro control unit has a memory element for storing the fingerprint matching software and the registered fingerprint datum.

Preferably, the memory element is an electrically erasable programmable read-only memory (EEPROM).

Preferably, the key further includes a memory, mounted on the printed circuit board and linked to the micro control unit, for storing the fingerprint matching software and the registered fingerprint datum.

Preferably, the fingerprint sensor is embedded in the printed circuit board with at least a portion exposed out of a top layer of the printed circuit board.

Preferably, the housing is made of metal, thermosetting plastics, or a combination thereof.

Preferably, an action needs to be applied to the housing to unlock the lock.

Preferably, the action is exerting a torque.

DETAILED DESCRIPTION OF THE PREFERRED EMBODIMENTS

The present invention will now be described more specifically with reference to the following embodiments.

First Embodiment

Figure 1:
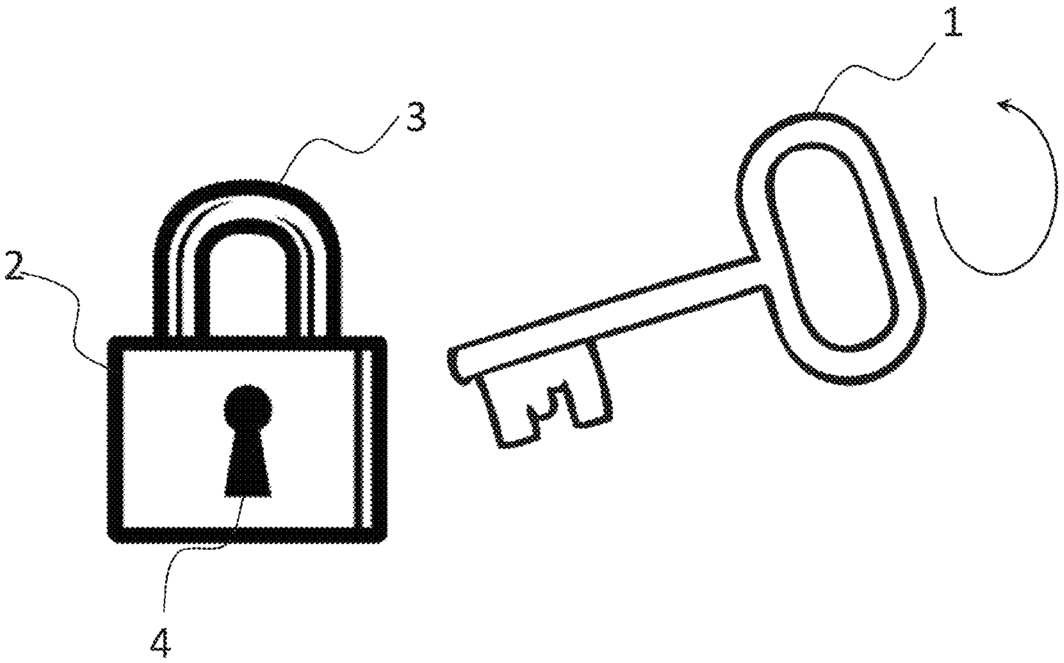
Fig. 1 (Prior Art)
FIG. 1 is a conventional set of key and lock.
Figure 2:
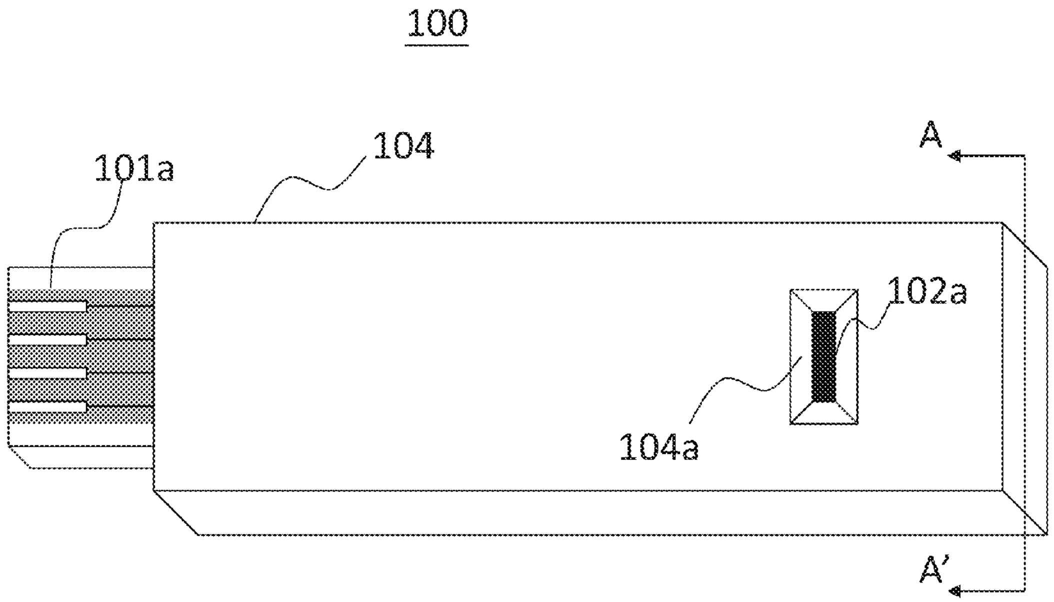
FIG. 2 illustrates a perspective view of a first embodiment according to the present invention.
Figure 3:
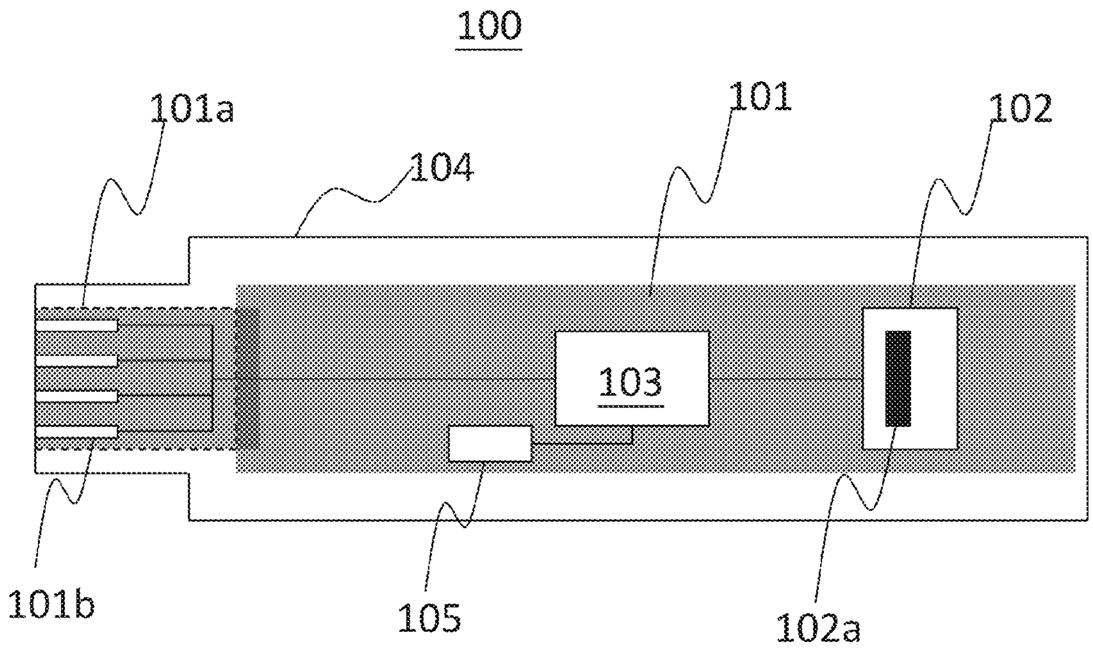
FIG. 3 is sectional view along an A-A' line in FIG. 2.
Figure 4:
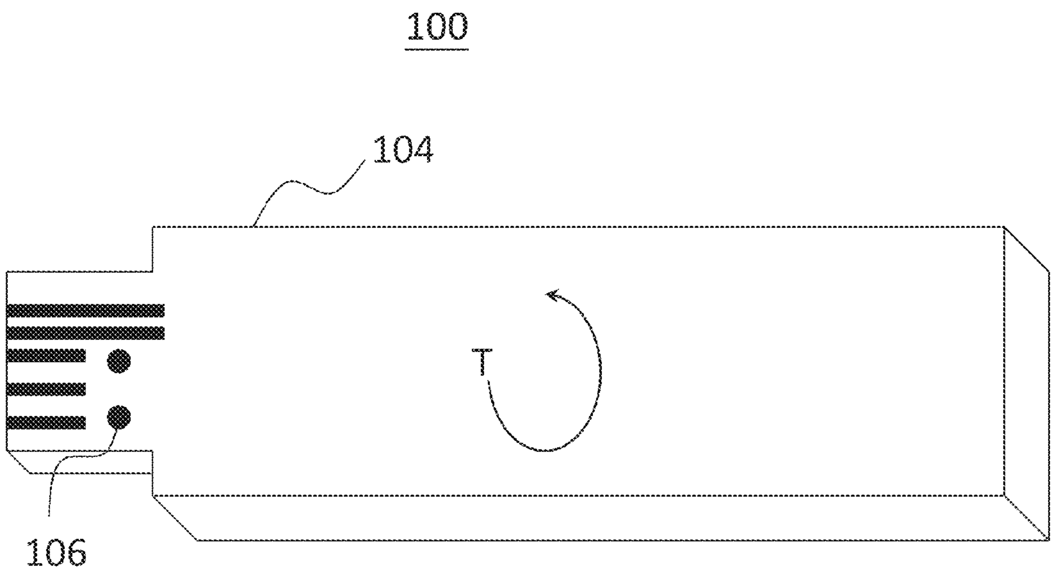
FIG. 4 illustrates another perspective view of the first embodiment.

Please refer to FIG. 2 to FIG. 4. A first embodiment of the present invention is disclosed. FIG. 2 illustrates a perspective view of a first embodiment according to the present invention. FIG. 3 is the sectional view along an A-A' line in FIG. 2. FIG. 4 illustrates another perspective view of the first embodiment.

A compound and securable key 100 is composed of a printed circuit board 101, a fingerprint sensor 102, a micro control unit 103, and a housing 104. The printed circuit board 101 is like any other printed circuit boards used in electronic products no matter is it multi-layered and what materials it uses. The only difference is that the printed circuit board 101 has an extension portion (enclosed by dashed lines) which forms a connector 101*a*. The connector 101*a* is used for connecting with an external adaptor (not shown). When the connector 101*a* is linked to the adaptor, data can be transmitted via terminals 101*b* of the connector 101*a*. In this embodiment, the connector 101*a* is a Universal Serial Bus (USB) connector.

The fingerprint sensor 102 is installed in the printed circuit board 101. Namely, the fingerprint sensor 102 is embedded in the printed circuit board 101 with at least a portion exposed out of a top layer of the printed circuit board 101. The embedded fingerprint sensor 102 can help reducing thickness of the printed circuit board assembly (PCBA), reducing the overall thickness of the compound and securable key 100 indirectly. Of course, according to the spirit of the present invention, the fingerprint sensor 102 can be directly mounted on the printed circuit board 101 as long as the PCBA meets design requirement. The fingerprint sensor 102 can fetch a fingerprint image, transform the fingerprint image into a fingerprint data and transmit the fingerprint data. The fingerprint sensor 102 further comprises a touching portion 102*a*. The touching portion 102*a* is used for a finger to slide over and the fingerprint image can be detected by scanning change of capacitance on the touching portion 102*a*.

The micro control unit 103 is mounted on the printed circuit board 101 and electrically linked to the fingerprint sensor 102. The micro control unit 103 receives the fingerprint data from the fingerprint sensor 102 and matches the fingerprint data with at least one of registered fingerprint datum by a fingerprint matching software. It can further transmit a matching data to the adaptor (not shown) via the connector 101*a* when the fingerprint data matches one registered fingerprint data. It should be noticed that a memory 105 is mounted on the printed circuit board 101 and linked to the micro control unit 103. Function of the memory 105 is for storing the fingerprint matching software and the registered fingerprint datum. Here, the registered fingerprint datum represents datum extracted from fingerprint images, which is fetched from the members of a family. With identification (or matching processes) of the fingerprint matching software, a member uses the compound and securable key 100 can be recognized by a corresponding lock by the transmitted matching data.

Of course, according to the spirit of the present invention, the micro control unit 103 can have a memory element inside for storing the fingerprint matching software and the registered fingerprint datum, rather than linking to the memory 105. It means the micro control unit 103 is a System-on-a-Chip system, and the memory is no longer need under this situation. The key point is the fingerprint matching software and the registered fingerprint datum should have some place to store. Since the micro control unit 103 is in the form of an integrated circuit, the memory element can be easily designed in. For example, an electrically erasable programmable read-only memory (EEPROM) can be applied.

The housing 104 has patterns 106 formed on the surface behind the connector 101*a*. It partially covers the printed circuit board 101 (leaving the portion of the connector 101 for use). Comparing FIG. 2 and FIG. 3, the housing 104 exposes the touching portion 102*a* of the fingerprint sensor 102 (not entire fingerprint sensor 102) for users to slide their fingers over. A surrounding portion of the housing 104 is made to guide users' fingers and has advantage to protect the touching portion 102*a* against violent force over it. The housing 104 protects the printed circuit board 101 and the micro control unit 103 inside and provides the patterns 106 as an identification for a locking mechanism (not shown).

It should be emphasized that when the matching data is transmitted to the adaptor and the identification is identified by the lock mechanism at the same time, a lock (not shown) corresponding to the compound and securable key 100 which has accesses of the adaptor and the locking mechanism is unlocked. It means the lock needs to work (lock or un-lock) with both key patterns 106 and user's fingerprint as the defaults.

As to the materials used to make the housing 104, it is steel. Steel can be formed to shape the desired patterns 106 and hard to be worn out. According to the spirit of the present invention, the materials can be metal, thermosetting plastics, or a combination of metal and thermosetting plastics as long as it is rigid enough.

When the compound and securable key 100 is plugged into the connector of the lock, sometimes, according to the design of the lock, an action needs to be applied to the housing 104 to unlock the lock. For example, like a conventional key, a torque need to be exerted to release the lock mechanism. Of course, a pushing force, vertically or horizontally, is applicable.

Second Embodiment

Figure 5:
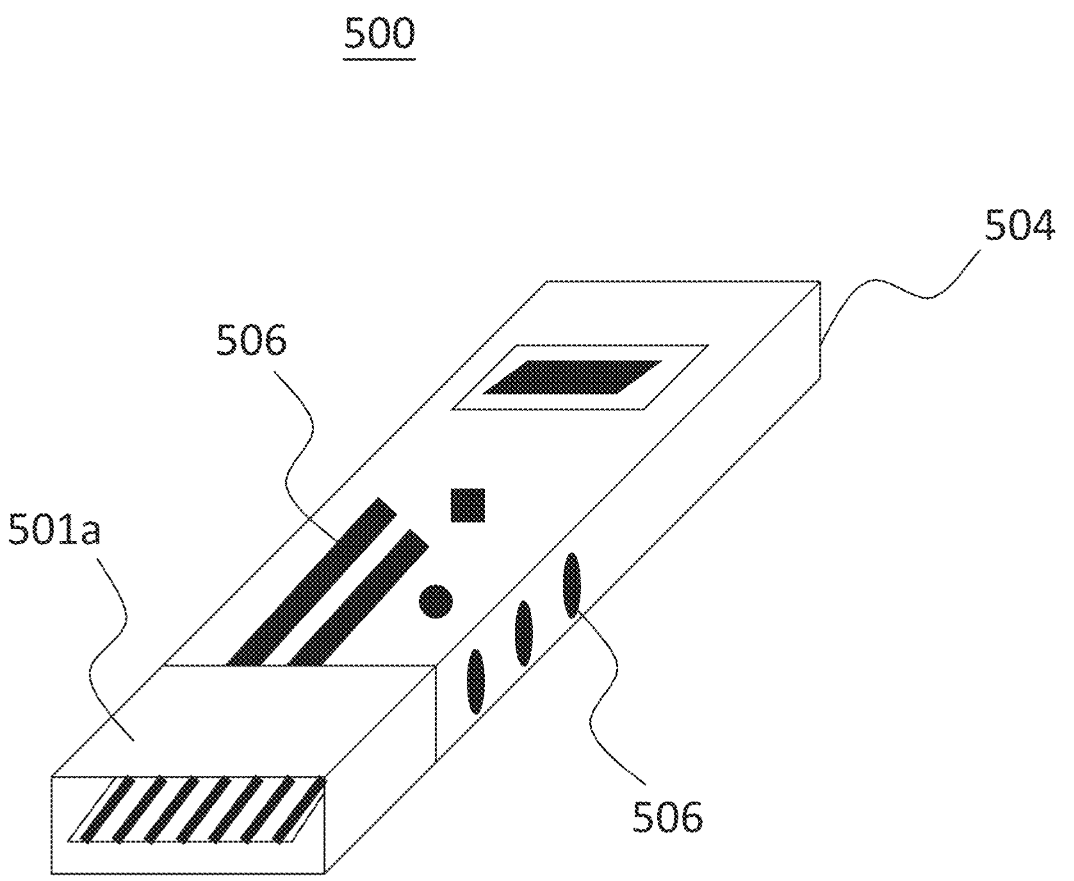
FIG. 5 illustrates a perspective view of a second embodiment according to the present invention.

Please refer to FIG. 5. FIG. 5 illustrates a perspective view of a second embodiment according to the present invention.

Composition of a compound and securable key 500 is like what are disclosed in the first embodiment. Namely, a printed circuit board, a fingerprint sensor, a micro control unit, a housing and patterns on the housing are necessary elements. In order to save time, only the differences between the first embodiment and the second embodiment according to the spirit of the present invention are discussed in details below.

The printed circuit board of the compound and securable key 500 are entirely enclosed by a housing 504. It is to say that it is not mattered if the printed circuit board is revealed or not. In the first embodiment, the connector 101*a* is formed on the printed circuit board 101. However, an available modularized connector 501*a* can be mounted on the printed circuit board of the compound and securable key 500. In practice, the connector 501*a* can be any existing one depending on design specification. For example, an External Serial Advanced Technology Attachment (e-SATA) connector is used in the present embodiment.

Last, the most advantageous point is a housing 504 of the compound and securable key 500 can have key patterns 506 'any place' except where a fingerprint sensor 504 is exposed out of the housing 504. Please refer to FIG. 5. A portion of the top surface of the housings 504 and a portion of the side surface of the housings 504 are covered with patterns 506. Arrangement of patterns 506 follows lock's design as long as the patterns 506 can be detected mechanically.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A compound and securable key, comprising:

a printed circuit board, having an extension portion which forms a connector for connecting with an adaptor, wherein a plurality of terminals are formed on the extension portion for transmitting data to and from the adaptor;

a fingerprint sensor, installed in or on the printed circuit board, for fetching a fingerprint image, transforming the fingerprint image into a fingerprint data and transmitting the fingerprint data;

a microprocessor, mounted on the printed circuit board and electrically linked to the fingerprint sensor, for receiving the fingerprint data, matching the fingerprint data with at least one of registered fingerprint datum by a fingerprint matching software and transmitting a matching data to the adaptor via the connector when the fingerprint data matches one registered fingerprint data; and a housing, partially covering the printed circuit board leaving the fingerprint sensor exposed, for protecting the printed circuit board and the microprocessor, wherein a plurality of key patterns are formed on the extension portion at a side opposite to the plurality of terminals while the plurality of terminals are revealed from the housing and formed on the housing at a place away from the connector while the plurality of terminals are accommodated in the housing to distinguish one from another compound and securable keys and to physically engage with a lock while the compound and securable key is inserted into the lock, and wherein the lock is unlocked when the adaptor receives the matching data and the key patterns matches a lock mechanism of the lock.

2. The key according to claim 1, wherein the connector is mounted on the printed circuit board for connecting with the adaptor.

3. The key according to claim 1, wherein the connector is a Universal Serial Bus (USB) connector or an External Serial Advanced Technology Attachment (e-SATA) connector.

4. The key according to claim 1, wherein the microprocessor has a memory element for storing the fingerprint matching software and the registered fingerprint datum.

5. The key according to claim 4, wherein the memory element is an electrically erasable programmable read-only memory (EEPROM).

6. The key according to claim 1, further comprising a memory, mounted on the printed circuit board and linked to the microprocessor, for storing the fingerprint matching software and the registered fingerprint datum.

7. The key according to claim 1, wherein the fingerprint sensor is embedded in the printed circuit board with at least a portion exposed out of a top layer of the printed circuit board.

8. The key according to claim 1, wherein the housing is made of metal, thermosetting plastics, or a combination thereof.

9. The key according to claim 1, wherein an action needs to be applied to the housing to unlock the lock.

10. The key according to claim 9, wherein the action is exerting a torque.

* * * * *